United States Patent
Takeda et al.

(10) Patent No.: US 10,063,727 B2
(45) Date of Patent: Aug. 28, 2018

(54) MARKING APPARATUS AND DECOLORING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Kazuhisa Takeda, Tagata Shizuoka (JP); Yoshihito Shimada, Numazu Shizuoka (JP); Tsuyoshi Itou, Izunokuni Shizuoka (JP); Yasuhito Noda, Mishima Shizuoka (JP); Masahiro Ikuta, Tagata Shizuoka (JP); Takafumi Hara, Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/982,492

(22) Filed: Dec. 29, 2015

(65) Prior Publication Data
US 2017/0187901 A1    Jun. 29, 2017

(51) Int. Cl.
| | |
|---|---|
| H04N 1/40 | (2006.01) |
| H04N 1/60 | (2006.01) |
| H04N 1/00 | (2006.01) |
| H04N 1/23 | (2006.01) |
| H04N 1/04 | (2006.01) |
| G06K 15/02 | (2006.01) |
| B41M 7/00 | (2006.01) |

(52) U.S. Cl.
CPC ......... *H04N 1/00803* (2013.01); *G06K 15/02* (2013.01); *H04N 1/0057* (2013.01); *H04N 1/0461* (2013.01); *H04N 1/2323* (2013.01); *B41M 7/0009* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,241,992 A | * | 12/1980 | Flint | G03B 27/47 355/41 |
| 4,897,731 A | * | 1/1990 | Kuehnle | B82Y 10/00 250/472.1 |
| 5,016,096 A | * | 5/1991 | Matsunawa | H04N 1/62 358/448 |
| 5,206,687 A | * | 4/1993 | Suzuki | H04N 1/3872 399/156 |
| 5,210,547 A | * | 5/1993 | Watanabe | G06K 15/028 346/134 |

(Continued)

*Primary Examiner* — Madelein Nguyen
(74) *Attorney, Agent, or Firm* — Amin, Turocy & Watson LLP

(57) ABSTRACT

Certain embodiments provide a marking apparatus, which marks on media that is reusable by recording and erasing decolorable material, comprising a scanner configured to read media to which a first mark representing the reuse times of media is attached; a determination section configured to determine whether or not the media is reusable according to a reading result of the first mark or a use state of the media; and a recording section configured to print a second mark different from the first mark on the media according to a determination result representing that the media cannot be reused.

14 Claims, 7 Drawing Sheets

(56) References Cited

U.S. PATENT DOCUMENTS

| | | | | |
|---|---|---|---|---|
| 5,617,399 A * | 4/1997 | Spruit | G11B 7/126 | 369/116 |
| 5,651,619 A * | 7/1997 | Nunokawa | B41J 3/4075 | 400/61 |
| 5,825,923 A * | 10/1998 | Thompson | G06K 9/4604 | 382/204 |
| 5,896,403 A * | 4/1999 | Nagasaki | G06F 17/30017 | 369/14 |
| 6,061,307 A * | 5/2000 | Shimazaki | G11B 11/10502 | 369/13.1 |
| 6,173,154 B1 * | 1/2001 | Kucinski | G06K 17/0032 | 434/322 |
| 6,236,831 B1 * | 5/2001 | Mei | B41J 29/36 | 15/102 |
| 6,317,147 B1 * | 11/2001 | Tanaka | H04N 1/506 | 347/116 |
| 6,535,706 B1 * | 3/2003 | Konno | H04N 1/38 | 358/452 |
| 6,690,485 B1 * | 2/2004 | Borrell | B41J 2/5058 | 358/1.9 |
| 6,961,127 B2 * | 11/2005 | Bjork | G01N 21/8903 | 356/237.2 |
| 8,308,262 B2 * | 11/2012 | Yoshida | B41J 11/0015 | 347/102 |
| 8,691,487 B2 * | 4/2014 | Aoki | G03G 9/08755 | 399/252 |
| 9,199,500 B1 * | 12/2015 | Umetsu | G03G 21/02 | |
| 9,213,286 B1 * | 12/2015 | Ogasawara | G03G 15/0189 | |
| 9,272,559 B2 * | 3/2016 | Nishijima | B41M 7/0009 | |
| 9,302,494 B2 * | 4/2016 | Yamaguchi | B41J 11/008 | |
| 9,302,526 B1 * | 4/2016 | Saino | B41J 29/38 | |
| 9,335,681 B2 * | 5/2016 | Ueno | G03G 15/2039 | |
| 9,365,068 B2 * | 6/2016 | Numakura | B41M 7/0009 | |
| 9,378,439 B2 * | 6/2016 | Kimoto | G06K 15/1868 | |
| 9,487,042 B2 * | 11/2016 | Hiyoshi | B41M 7/0009 | |
| 9,630,438 B1 * | 4/2017 | Miyazaki | B41M 7/0009 | |
| 9,815,313 B2 * | 11/2017 | Hashimoto | B41M 7/0009 | |
| 2001/0033688 A1 * | 10/2001 | Taylor | G06K 17/0032 | 382/181 |
| 2002/0135788 A1 * | 9/2002 | Arakawa | G03C 1/49881 | 358/1.1 |
| 2003/0095113 A1 * | 5/2003 | Ma | H04N 1/2166 | 345/175 |
| 2003/0163633 A1 * | 8/2003 | Aasheim | G06F 3/0616 | 711/103 |
| 2004/0056105 A1 * | 3/2004 | Silverbrook | B41J 2/1623 | 235/494 |
| 2004/0120547 A1 * | 6/2004 | Mampe | B07C 3/12 | 382/101 |
| 2005/0218236 A1 * | 10/2005 | Silverbrook | B41J 2/14 | 235/494 |
| 2006/0035204 A1 * | 2/2006 | LaMarche | G09B 7/02 | 434/350 |
| 2006/0039250 A1 * | 2/2006 | Cherubini | G11B 9/1454 | 369/44.27 |
| 2006/0082836 A1 * | 4/2006 | Mimura | H04N 1/407 | 358/448 |
| 2007/0274747 A1 * | 11/2007 | Kimura | G03G 9/0819 | 399/302 |
| 2008/0304109 A1 * | 12/2008 | Ishida | B65H 29/60 | 358/3.28 |
| 2010/0201995 A1 * | 8/2010 | Yoshida | H04N 1/00355 | 358/1.2 |
| 2010/0272362 A1 * | 10/2010 | Ohnishi | H04N 1/00374 | 382/187 |
| 2012/0189340 A1 * | 7/2012 | Hagiwara | B41J 2/32 | 399/82 |
| 2012/0263381 A1 * | 10/2012 | Yoshida | G06F 3/03545 | 382/189 |
| 2013/0070265 A1 * | 3/2013 | Megawa | H04N 1/40 | 358/1.9 |
| 2013/0258026 A1 * | 10/2013 | Iguchi | B41M 7/0009 | 347/179 |
| 2014/0192125 A1 * | 7/2014 | Arima | B41J 2/32 | 347/179 |
| 2014/0376008 A1 * | 12/2014 | Yamaguchi | B41J 11/008 | 358/1.5 |
| 2015/0054905 A1 * | 2/2015 | Saino | B41J 29/36 | 347/179 |
| 2015/0116439 A1 * | 4/2015 | Kamimura | B41J 2/355 | 347/179 |
| 2015/0124270 A1 * | 5/2015 | Megawa | H04N 1/32133 | 358/1.9 |
| 2015/0130885 A1 * | 5/2015 | Meguro | B41M 7/0009 | 347/179 |
| 2015/0346633 A1 * | 12/2015 | Megawa | G03G 15/0831 | 358/1.1 |
| 2015/0350477 A1 | 12/2015 | Takeda et al. | | |
| 2015/0378292 A1 * | 12/2015 | Katakura | G03G 15/6585 | 399/223 |
| 2016/0041514 A1 * | 2/2016 | Hashimoto | G03G 15/50 | 399/67 |
| 2016/0067999 A1 * | 3/2016 | Hiyoshi | B41M 7/0009 | 347/179 |
| 2016/0088192 A1 * | 3/2016 | Mizuno | H04N 1/60 | 358/1.9 |
| 2017/0120657 A1 * | 5/2017 | Konagaya | B41M 5/305 | |

\* cited by examiner

MARKING APPARATUS AND DECOLORING APPARATUS

FIELD

Embodiments described herein relate generally to a marking apparatus and a decoloring apparatus.

BACKGROUND

There is known a technology in which the color of an image printed on a paper (sheet) with decolorable material (toner or ink) is erased by a decoloring apparatus, and it becomes possible to reuse paper through this technology.

However, the paper will damage due to the repeated decoloring operation. Then the damaged paper may cause a paper jam in the decoloring apparatus or in the image forming apparatus.

Conventionally, the decoloring apparatus prints a mark (reuse mark) representing a decolored times on the paper every time a decoloring processing of an image is carried out.

The reuse mark is read by a scanner, and the decoloring apparatus discharges the paper to a reject tray in a case in which the decoloring times is greater than a given times according to the read value of mark. Alternatively, if it is determined that the paper can hardly be reused because the media is broken, the decoloring apparatus discharges the paper to the reject tray.

However, on the paper discharged to the reject tray, there is no module (mark) used to identify that it is the paper that has already been discharged in the reject tray other than the reuse mark, the user may sometimes mistake the paper as the reusable paper at first glance. Thus, it is afraid that the user may use a paper the decolored times of which is greater than a given times again.

DETAILED DESCRIPTION

Figure 1:
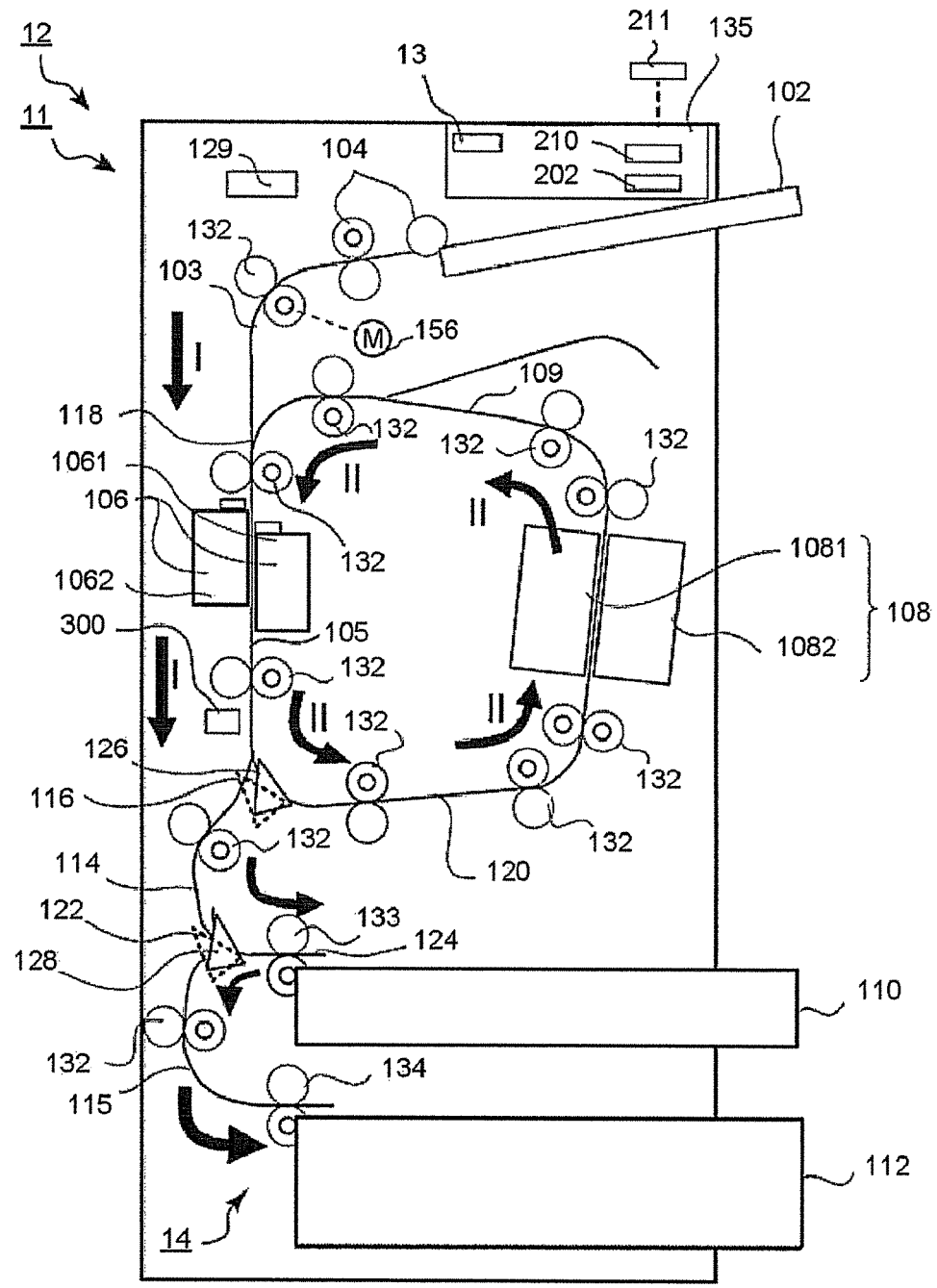
FIG. 1 is a diagram illustrating the constitution of a decoloring apparatus comprising a marking apparatus according to an embodiment.

Certain embodiments provide a marking apparatus, which marks on media that is reusable by recording and erasing decolorable material, comprising: a scanner configured to read media to which a first mark representing the reuse times of media is attached; a determination section configured to determine whether or not the media is reusable according to the reading result of the first mark read by the scanner or a use state of the media; and a recording section configured to print a second mark different from the first mark on the media when the determination section determines that the media cannot be reused.

Certain embodiments provide a decoloring apparatus, including: a scanner configured to be arranged on a first conveyance path to read media to which a first mark representing the reuse times of media is attached; an erasing section configured to be arranged on a second conveyance path, which branches off from the first conveyance path at the downstream side of the scanner and merges with the first conveyance path I at the upstream side of the scanner on the first conveyance path, to erase the image recorded on the media; a determination section configured to determine whether or not the media is reusable according to the reading result of the first mark read by the scanner or a use state of the media; and a recording section configured to print a second mark different from the first mark on the media according to a determination result representing that the media cannot be reused determined by the determination section.

Hereinafter, a marking apparatus and a decoloring apparatus are described in detail with reference to the accompanying drawings. Further, same components are applied with same reference numerals in the drawings, and therefore the repeated description is not provided below.

A First Embodiment

FIG. 1 is a diagram illustrating the constitution of a decoloring apparatus comprising a marking apparatus according to the first embodiment.

A marking apparatus 11 marks media that is reusable by recording or erasing decolorable material.

The marking apparatus 11 comprises a scanner 106, a determination section 13 and a recording section 300.

A decoloring apparatus 12 comprises the scanner 106, an erasing section (decoloring section) 108, the determination section 13 and the recording section 300.

Figure 6:
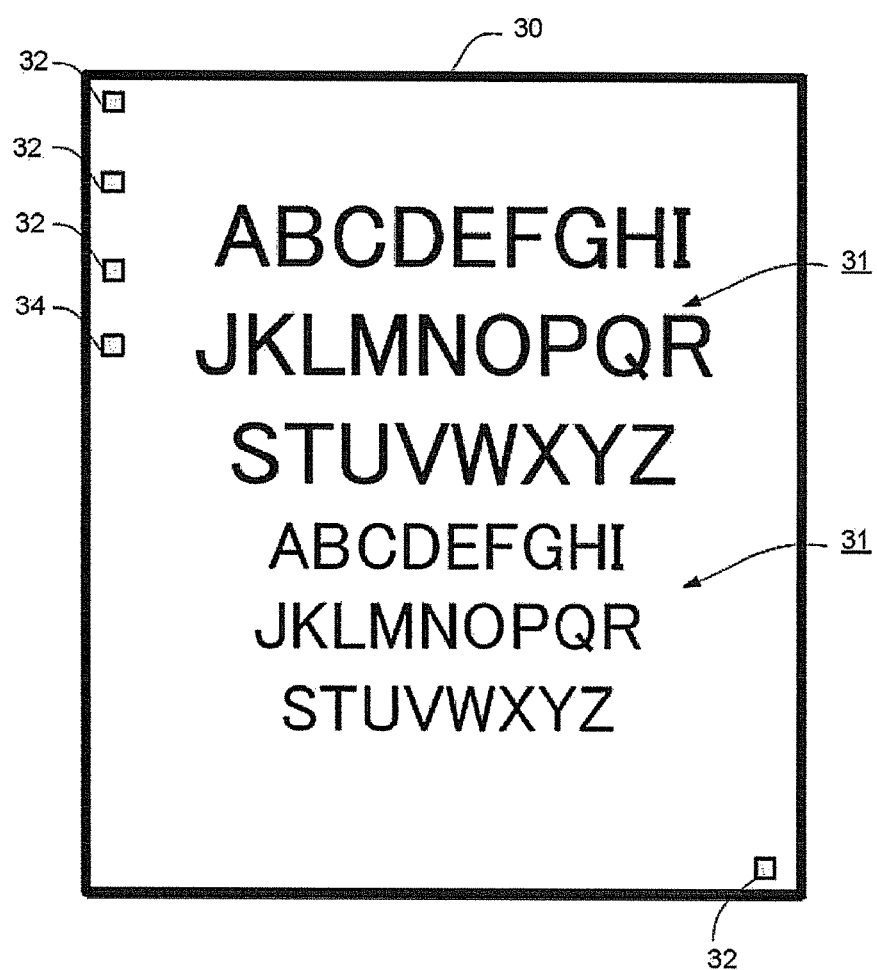
FIG. 6 is a diagram illustrating a first example of a media attached with marks by the decoloring apparatus according to the embodiment.

The scanner 106 is arranged on a first conveyance path I, and reads the media to which marks 32 and 34 (first marks) representing the reuse times of media are attached as shown in FIG. 6.

The determination section 13 determines whether or not the media is reusable according to the reading result of the marks 32 and 34 read by the scanner 106 or a using state of the media.

Figure 7:
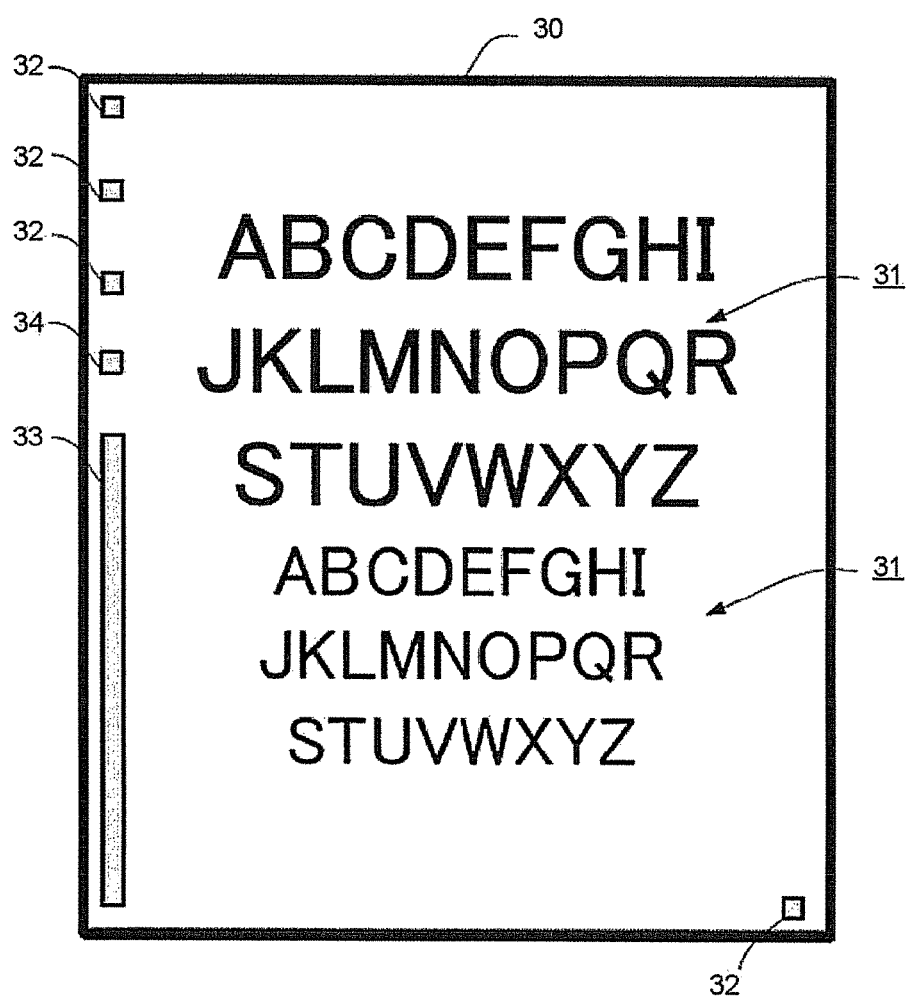
FIG. 7 is a diagram illustrating a second example of a media attached with marks by the decoloring apparatus according to the embodiment.

According to a determination result representing that the media is no longer reusable by the determination section 13, the recording section 300 prints a linear ink mark line 33 (a second mark) different from the marks 32 and 34 on the media as shown in FIG. 7.

The ink mark line 33 may have a shape different from that of the read mark.

The marks (marks 32 and 34 in FIGS. 6 and 7) are ink marks (printing times marks or times ink marks) marked previously on the media by the decoloring apparatus 12.

The first conveyance path I is defined to be a path from a paper feed tray 102 to a paper discharge tray (first paper discharge tray) 110 and a paper discharge tray (second paper discharge tray) 112.

The first conveyance path I includes the paper feed tray 102 and guides 103, 105, 114 and 115.

A second conveyance path II is a path of a closed loop which branches off from the first conveyance path I at the downstream side of the scanner 106 and merges with the first conveyance path I at the upstream side of the scanner 106.

The upstream side and downstream side herein refer to the upstream side and downstream side respectively, in a media conveyance direction.

The scanner 106 stores a scan image before a decoloring processing in a storage 210.

The scanner 106 scans the media subjected to the decoloring processing again. The scanner 106 analyzes the printed marks through the pattern data stored in advance.

Through the analysis, the scanner 106 determines whether or not it is media using the decolorable toner. In this way, the scanner 106 determines whether or not the media subjected to the decoloring processing is reusable.

The erasing section 108 decolors a color of the image on the media on the second conveyance path II. An image forming apparatus forms an image on the media with the decolorable toner.

The second conveyance path II is defined by the scanner 106, guides 105, 120 and 109, the erasing section 108 and the scanner 106.

The determination section 13 determines that the media is not reusable according to the scan image on the media scanned by the scanner 106 after the media passes through the erasing section 108.

The recording section 300 is an inkjet head printer using non-decolorable ink.

The recording section 300 records a continuous line from a marking start point on the media to the rear end in the conveyance direction of the media.

The ink mark line 33 recorded by the recording section 300 is longer than the mark 32 in the media conveyance direction. The length of the ink mark line 33 may vary with the recording of the recording section 300.

The paper has long sides with long sizes far-longer than the sizes of the short sides thereof. The media conveyance direction parallels the long sides. The conveyance direction corresponds to the vertical scanning direction of the image forming apparatus.

The decoloring apparatus 12 is further provided with a branching section 122.

The branching section 122 is connected with the first conveyance path I from the paper feed tray 102 to the paper discharge trays 110 and 112.

The branching section 122 guides the media that has been determined to be not reusable by the determination section 13 to the paper discharge tray 112.

The paper discharge tray 110 discharges the decolored media by the erasing section 108, and then stacks the discharged media in the tray. The paper discharge tray 110 is not only a paper discharge section but also a stacking section. The paper discharge tray 112 is exemplified identically to the example of the paper discharge tray 110.

When describing the constitution of elements, the decoloring apparatus 12 is provided with the paper feed tray 102 at the uppermost side. The media is fed from the paper feed tray 102.

The decoloring apparatus 12 is provided with a paper feed section 104 and a plurality of pairs of rollers 132 at the further downstream side of the paper feed tray 102.

The paper feed section 104 includes a pickup roller, a feed roller and a separation roller. The paper feed section 104 feeds the media one by one from the uppermost of the bundle of media on the paper feed tray 102 to the guide 103.

Each of plural pairs of rollers 132 is a conveyance roller (only one roller 132 is shown in FIG. 1). The plural pairs of rollers 132 convey the media by means of a motor 156.

A mergence point 118 is arranged below the guide 103 in the decoloring apparatus 12.

The decoloring apparatus 12 is equipped with the scanner 106 below the mergence point 118.

The scanner 106 reads printing mark on the media.

The scanner 106 may respectively comprise a scanner unit 1061 and a scanner unit 1062 on the first surface side and the second surface side of the media.

The scanner unit 1061 is a CCD (Charge Coupled Device) scanner or a CMOS (Complementary Metal Oxide Semiconductor) sensor. The scanner unit 1062 is substantially the same as the scanner unit 1061.

The decoloring apparatus 12 is further provided with an operation panel 135, a controller 129 and a page memory 202.

The operation panel 135 is a user interface for the decoloring apparatus 12. The operation panel 135 transmits/receives command signals to/from the controller 129.

The controller 129 controls the entire decoloring apparatus 12 collectively.

The controller 129 switches the rotation position state of each of switches 126 and 128. The switches 126 and 128 are pivotally supported in the decoloring apparatus 12 in a rotatable manner.

The page memory 202 stores scan images from the scanner 106. The scan images are bitmap image data.

The decoloring apparatus 12 includes the guide 105 and a first branching section 116 below the scanner 106.

The switch 126 is arranged at the first branching section 116. The switch 126 sends the media from the guide 105 to either the guide 114 or the guide 120.

The controller 129 switches the switch 126 to a first rotation position. Through the switching operation, the decoloring apparatus 12 enables the media fed from the paper feed tray 102 to travel around the closed loop in order of the scanner 106, the erasing section 108, and the scanner 106.

The erasing section 108 is provided with a decoloring unit 1081 and a decoloring unit 1082 respectively on the first, surface side and the second surface side of the media.

The erasing section 108 decolors the image through the heat at a certain temperature.

The decolorable toner is made of decolorable color material. The color of toner is erased when the temperature of toner reaches a given temperature.

Specifically, the decolorable color material includes a color generation compound, a developer and a decoloring agent. The color generation compound is leuco dye. The developer is phenols.

The decoloring agent is substance that can dissolve together with the color generation compound by being heated. The substance that does not have affinity with the developer is used as the decoloring agent.

The decolorable color material generates a color through an interaction between the color generation compound and the developer.

The decolorable color material is heated at a decoloring temperature or a high temperature higher than the decoloring temperature, and then the interaction between the color generation compound and the developer is eliminated. In this way, the decolorable color material is decolored.

The decoloring temperature is a high temperature higher than the fixing temperature.

The decoloring apparatus 12 is provided with the guide 109 above the erasing section 108. The mergence point 118 is positioned at the downstream side of the guide 109 in the first conveyance path I.

The decoloring apparatus 12 further comprises the recording section 300 between the second branching section 122 and the scanner 106.

As the decolored media is sent to the scanner 106 again after passing through the erasing section 108, the recording section 300 is positioned at the downstream side of the scanner 106.

The decoloring apparatus 12 is further provided with the guide 114 below the recording section 300. The decoloring apparatus 12 also comprises the second branching section 122 and a paper discharge section 14 below the guide 114.

Figure 2:
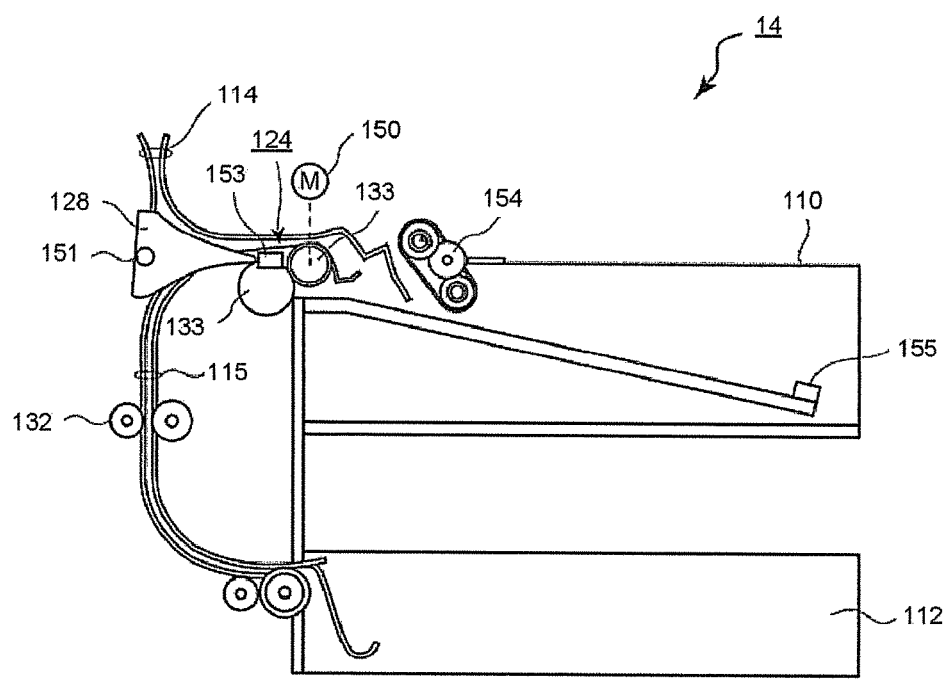
FIG. 2 is a diagram illustrating an example of the constitution of a paper discharge section of the decoloring apparatus according to the embodiment.

FIG. 2 is a diagram illustrating an example of the constitution of the paper discharge section 14. In FIG. 2, the same reference numerals represent same components as shown in FIG. 1.

The paper discharge section 14 includes a pair of discharge rollers 133, a discharge motor 150, the guides 114 and 115, the paper discharge trays 110 and 112.

The discharge rollers 133 are opposite to each other across the conveyance path.

The discharge motor 150 rotates the discharge rollers 133. The controller 129 controls the rotation operation.

The paper discharge trays 110 and 112 are arranged at the downstream side on the conveyance path of the paper discharge section 14.

The media for reuse is placed in the paper discharge tray 110 through the discharge rollers 133.

The media for reuse refers to the media subjected to decoloring processing that is determined to be reusable by the scanner 106 or the determination section 13.

The paper discharge tray 112 is a reject tray. The rejected media is placed in the paper discharge tray 112 through the discharge rollers 133.

The rejected media refers to the media subjected to decoloring processing that is determined to be not reusable by the scanner 106 or the determination section 13.

The paper discharge trays 110 and 112 sort the media according to the reuse possibility of the media.

The decoloring apparatus 12 comprises one or a plurality of sensors 153 (only one sensor 153 is shown in FIG. 2) in front of the discharge roller 133.

The sensor 153 detects the existence of media. For example, the sensor 153 sends a light beam, and detects the reflected light beam.

The decoloring apparatus 12 comprises an aligning roller 154 at the inlet of the paper discharge tray 110. The aligning roller 154 aligns the positions of media on the paper discharge tray 110 in the media conveyance direction. The aligning roller 154 rotates through the driving of the discharge motor 150.

The paper discharge tray 110 includes a stopper 155 at the downstream side in the conveyance direction. The stopper 155 is a plate inside the paper discharge tray 110.

The paper discharge tray 110 conveys the front end of the media to the stopper 155 through the driving of the aligning roller 154.

The stopper 155 aligns the positions of the media on the paper discharge tray 110.

On the other hand, the decoloring apparatus 12 comprises a switch 128 at the upstream side of a guide 124 of the discharge rollers 33. The switch 128 guides the media from the guide 114 to either the tray 110 or the tray 112.

The switch 128 operates through a solenoid to switch to either the paper discharge tray 110 or the paper discharge tray 112. The switch 128 is rotatable around a shaft 151.

The decoloring apparatus 12 conveys the media to the paper discharge tray 110 temporarily. The decoloring apparatus 12 stops the media temporarily just before the rear end of the media passes through the discharge rollers 133.

The decoloring apparatus 12 makes the discharge motor 150 rotate reversely after the switch 128 conveys and stops the media.

Through the reverse rotation of the discharge rollers 133, the decoloring apparatus 12 enables the media to be conveyed in a reverse direction. The decoloring apparatus 12 discharges the media to the paper discharge tray 112.

Figure 3:
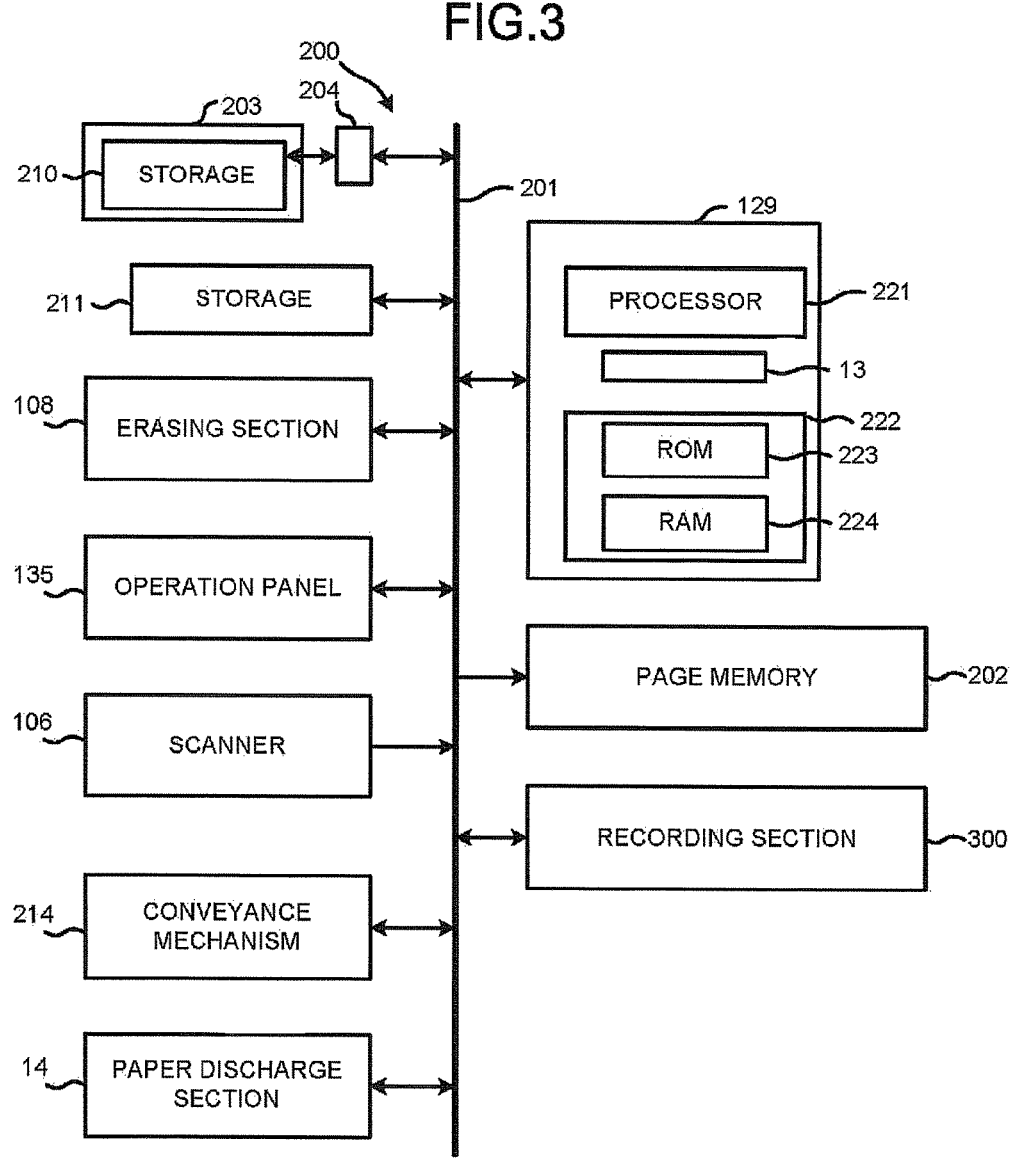
FIG. 3 is a block diagram illustrating a control system of the decoloring apparatus according to the embodiment.

FIG. 3 is a block diagram illustrating a control system of the decoloring apparatus 12. In FIG. 3, the reference numerals described above represent same components as those shown in FIG. 1 and FIG. 2.

A control system 200 comprises the controller 129, the storage 210 and a storage 211. The control system 200 further comprises a conveyance mechanism 214, the paper discharge section 14, the scanner 106, the page memory 202, the erasing section 108, the operation panel 135 and the recording section 300.

The controller 129 has a determination function of the determination section 13. The controller 129 has functions of printing control of mark and conveyance control of media.

A media that has been printed with marks indicating the decolored times is inserted into the decoloring apparatus 12. In this way, the controller 129 calculates the number of the marks that have already been printed.

The controller 129 compares the number of the marks obtained through the calculation with an erasing limit times.

In a case in which the number of the marks is equal to or greater than the erasing limit times, the controller 129 determines to print other mark different from the original mark on the media.

The other mark, which is different from the original mark indicating that the media is reusable, is printed on the media. It can be aware that the media is not reusable at a glance even though the people do not count the number of the marks.

The printing control of mark refers to that the controller 129 instructs the recording section 300 to print other mark.

The controller 129 controls the recording section 300 to print the linear ink mark line 33.

The recording section 300 may record information indicating that the media is not reusable through an equivalent mark to any one of the character, graph, sign and color.

Alternatively, the recording section 300 may record information indicating that the media is not reusable through any combination of each of the character, graph, sign and color.

Various changes are possible for the length, shape, color, size and number of the mark. Pattern data corresponding to the length, shape, color, size and number of the mark is pre-stored by the controller 129.

The controller 129 stores a specified size of media. The specified size includes the sizes of short sides and long sides of the media.

The controller 129 stores a plurality of types of media sizes.

For example, the controller 129 respectively stores the specified sizes as listed below: A4, B4 and A3 of ISO (International Organization for Standardization) 216; letter; legal and leisure.

The controller 129 and the recording section 300 may share the pre-stored data.

The controller 129 controls the scanner 106, the erasing section 108, the operation panel 135, the conveyance mechanism 214, the paper discharge section 14, the page memory 202 and the recording section 300 to control the conveyance of media.

At the timing when the media is output from the scanner 106, the controller 129 enables the conveyance mechanism 214 to convey the media towards the erasing section 108.

At the timing when the media is output from the erasing section 108, the controller 129 enables the conveyance mechanism 214 to convey the media to the scanner 106 again.

The functions of the controller 129 are executed through software by a processor 221 and a memory 222.

The memory 222 consists of a ROM 223 and a RAM 224. The ROM 223 stores control programs. The RAM 224 provides a temporary working area for the processor 221.

The storage 210 stores application programs and an OS (Operating System). The application programs include programs for executing reading operation by the scanner 106 and programs for executing decoloring operation by the erasing section 108.

The storage 211 has a storage area for storing scan images. For example, a server 203 constitutes the storage 211 (server "data holder").

The storage 210 and the storage 211 are hard disc drivers. Alternatively, the storage 210 and the storage 211 are silicon disc drivers.

A plurality of elements of the control system 200 is connected with each other through a bus line 201 and a network 204.

The conveyance mechanism 214 includes the paper feed tray 102, the guides 103, 105, 114 and 115, the switches 126 and 128.

The conveyance mechanism 214 further includes plural pairs of rollers 132 and motors 156 corresponding to the rollers 132. The conveyance mechanism 214 is provided with a solenoid corresponding to the switches 126 and 128.

The conveyance mechanism 214 drives the motors 156 individually through motor drives.

The conveyance mechanism 214 changes the rotation positions of the switches 126 and 128 individually through solenoid drivers.

The paper discharge section 14 drives the discharge motors 150 individually through motor drivers.

The hardware IC (Integrated Circuit) is used in the motor driver and the solenoid driver. Software may also be used in the motor driver and the solenoid driver.

Next, the operations of the decoloring apparatus 12 having above-described constitutions (FIG. 1) are described with reference to FIG. 4~FIG. 7.

Figure 4:
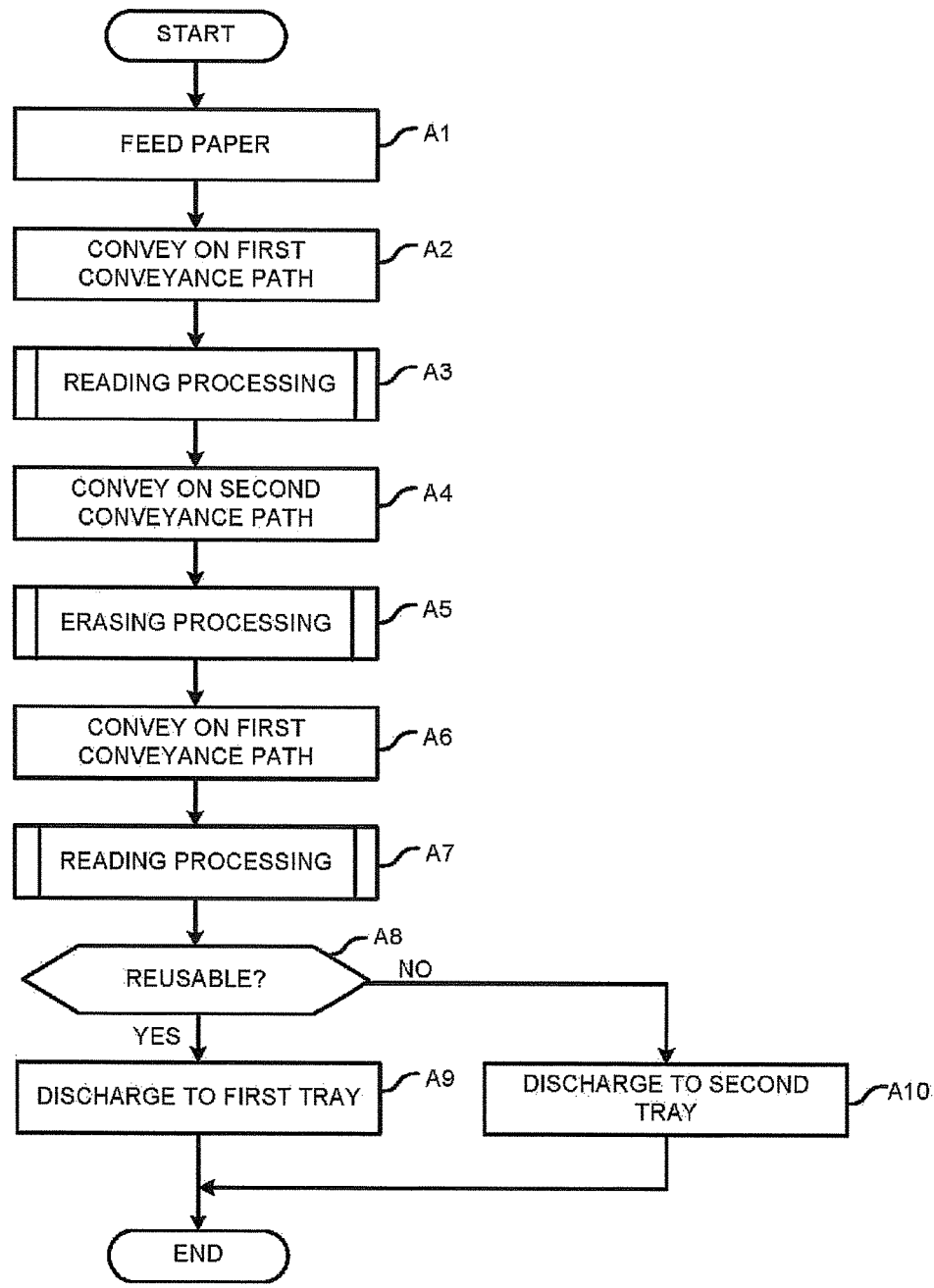
FIG. 4 is a flowchart illustrating a conveyance processing by the decoloring apparatus according to the decoloring apparatus.

FIG. 4 is a flowchart illustrating a conveyance processing of the decoloring apparatus 12.

In ACT A1, the paper feed section 104 receives a media on which there is an image.

In ACT A2, the conveyance mechanism 214 conveys the media towards the first conveyance path I.

In ACT A3, the scanner 106 reads the image. In ACT A3, the scanner 106 stores the scan image data in the storage 210.

In ACT A4, the conveyance mechanism 214 conveys the media towards the second conveyance path II.

In ACT A5, the erasing section 108 decolors the image on the media.

In ACT A5, the conveyance mechanism 214 guides the media to the second conveyance path II towards the guide 120 at the branching point (the first branching section 116).

The erasing section 108 heats the media in a manner of nipping the media, and conveys the media.

The erasing section 108 conveys the media at a conveyance speed while heating the media.

The erasing section 108 heats the media until a certain relation is established: the decoloring temperature of the media is equal to or higher than the temperature when the media is printed.

In ACT A6, the conveyance mechanism 214 returns the media to the first conveyance path I again. In ACT A6, the conveyance mechanism 214 enables the decolored media to pass through the mergence point 118.

In ACT A7, the scanner 106 scans the printed image again.

In ACT A8, the determination section 13 determines whether or not the media is reusable according to the read scan image.

In ACT A8, the determination section 13 outputs a positive result if the media is reusable.

Through the route of YES, the paper discharge section 14 discharges the media to the first paper discharge tray 110 in ACT A9.

In ACT A8, the determination section 13 outputs a negative result if the media is not reusable.

Through the route of NO, the paper discharge section 14 discharges the media to the second paper discharge tray 112 in ACT A10.

In ACT A10, the conveyance mechanism 214 continues to monitor the output of the sensor 153.

As shown in FIG. 2, the media moves along the guide 124. The rear end of the media passes through the sensor 153 after the front end of the media passes through the sensor 153.

The front end refers to an edge of the media at the side of the media conveyance direction. The rear end refers to an edge of the media at the opposite side to the media conveyance direction.

The controller 129 detects that the media moves away from the sensor 153. After the controller 129 detects that the media moves away from the sensor 153, the controller 129 enables the conveyance mechanism 214 to start to convey the media.

The conveyance mechanism 214 drives the discharge rollers 133 according to a rotation amount equivalent to a distance of a pre-programmed amount.

The media is stopped temporarily on the guide 124 at a position which is spaced by a distance from the sensor 153.

When the media is stopped on the guide 124, the determination processing by the determination section 13 has already terminated.

The controller 129 enables the conveyance mechanism 214 to switch-back and convey the media. The conveyance mechanism 214 makes the rear end of the media to be the front end thereof, and starts to convey the media to the paper discharge tray 112.

Alternatively, it takes time for the determination section 13 to carry out image determination processing in ACT A8 described above. In this case, the conveyance mechanism 214 waits for an output of a result on discharging the media to which one of the tray 110 and the tray 112 at the stopping position.

After the determination result of reuse possibility is output, the conveyance mechanism 214 selects either the reuse tray or the reject tray.

Sequentially, the marking operations are described with reference to FIG. 5-FIG. 7.

Figure 5:
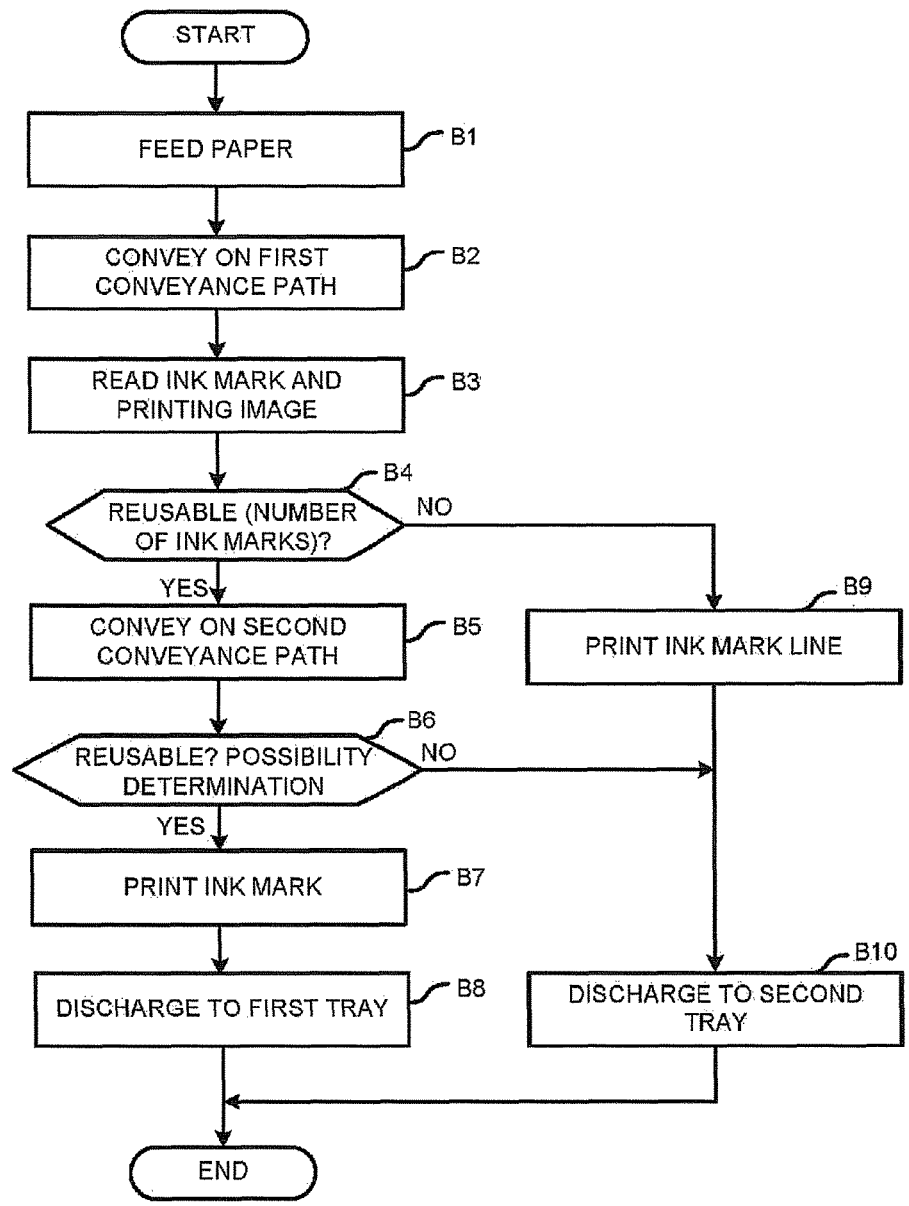
FIG. 5 is a flowchart illustrating marking operations and decoloring operations carried out by the decoloring apparatus according to the embodiment.

FIG. 5 is a flowchart illustrating the marking operation and the decoloring operation executed by the decoloring apparatus 12.

The operation panel 135 receives a manual operation on a start button.

In ACT B1, a paper is fed from the paper feed tray 102 to the decoloring apparatus 12.

In ACT B2, the conveyance mechanism 214 conveys the media to the first conveyance path.

In ACT B3, the scanner 106 reads an image. The scanner 106 stores image data in the storage 211.

The scanner 106 develops the image data on the page memory 202.

FIG. 6 is a diagram illustrating a first example of the media attached with marks. There is a plurality of images 31 on a paper 30 (media).

The images 31 are formed with decolorable material (toner) by an image forming apparatus (not shown).

For example, three margin marks 32 (first mark) are attached by the decoloring apparatus 12 (or other decoloring apparatus). For example, each of the marks 32 has a size of 2 mm*2.5 mm.

In ACT B3, there is no mark 34 (first mark) on the paper 30. The mark 34 is described later.

In ACT B3 in FIG. 5, the determination section 13 extracts the mark 32.

For example, the determination section 13 extracts images each of which the shape is represented by "☐" in FIG. 6 through image recognition. The determination section 13 carries out a matching of extracted data with a pre-stored shape pattern.

In ACT B4, the determination section 13 determines whether or not the media is reusable according to the number of the marks 32.

In ACT B4, the determination section 13 determines whether or not the number of the marks 32 is smaller than a pre-stored erasing limit times. The erasing limit times is obtained by subtracting 1 from the times that the sheet is reusable. In the present embodiment, it is described below that the reusable times of sheet is 5, and the erasing limit times is 4.

When the determination section 13 determines in ACT B4 that the number of marks is smaller than the erasing limit times, the determination section 13 determines that the media is reusable.

Through the route of YES in ACT B6, the determination section 13 determines whether or not the paper 30 is reusable.

The reason why the second time determination is carried out is that there is still a part where the color is not completely erased even if the decoloring processing is carried out on the second conveyance path II. For example, there exists a handwriting part or a printing part with non-decolorable toner.

There is a case in which a part remains on which the color cannot be erased due to handwriting or the like even after the decoloring processing is carried out, or there is a case in which the media cannot be used any longer due to its thinness. In these cases, the determination section 13 rejects the media.

In ACT B6, the determination section 13 determines that the media is reusable after the second time determination by the determination section 13 is carried out.

Through the route of YES in ACT B6, the recording section 300 prints a mark 34 on the paper 30 in ACT B7 shown in FIG. 6. The mark 34 is stamped on the paper 30 in addition to the marks 32.

The decoloring apparatus 12 prints the mark 34 (quadrangle: 2×2.5 mm) 10 mm away from and at the downstream side (lower side) of the mark 32 printed last time. The distance of 10 mm is just an example. Various changes are possible for the position of the additional mark.

In ACT B8 in FIG. 5, the paper discharge section 14 discharges the paper 30 added with the mark 34 to the paper discharge tray 110.

The decoloring apparatus 12 ends the processing in FIG. 5 after discharging the paper 30.

In this way, the media becomes a state indicating that the decoloring processing has already been carried out for at least 4 times.

Next, a processing in a case in which a media with a handwriting part thereon is fed to the decoloring apparatus 12 is described.

It is assumed that there are marks 32, the mark 34, the image 31 and a handwriting part on the paper 30.

The decoloring apparatus 12 reads the marks 32, the mark 34 and the image 31 (ACT B1-ACT B4 in FIG. 5).

In ACT B6 in FIG. 5, the determination section 13 determines that the media cannot be decolored.

Through the route of NO in ACT B6, the decoloring apparatus 12 rejects the media in ACT B10.

In the present embodiment, the decoloring apparatus executes determination operations for 2 times on the media of which the reuse times does not reach the erasing limit times (e.g. 4 times).

That is, after the decoloring apparatus 12 determines whether or not the reuse times is greater than or equal to the erasing limit times (ACT B4), the decoloring apparatus 12 guides the media to the second conveyance path II to heat it by the erasing section 108.

The decoloring apparatus 12 enables the media to pass through the first conveyance path I again, and enables the scanner 106 to determine whether or not the image is erased (ACT B6).

According to the determination result in ACT B6 that the color is not erased (route of NO), the decoloring apparatus 12 determines that the paper 30 cannot be reused.

For example, the decoloring apparatus 12 detects the media printed with toner that cannot be decolored. The media that is corrected with a pencil, a ball-pen or a felt-tip pen is discharged.

The decoloring apparatus 12 discharges the paper 30 to the paper discharge tray 112. The media that cannot be reused any more is discharged.

Next, the marking operations on the media of which the reuse times reach the erasing limit times are described.

In FIG. 5, the decoloring apparatus 12 reads the marks 32, the mark 34 and the image 31 on the paper 30 (ACT B1-'ACT B4).

In ACT B4, the determination section 13 determines that the number of the marks 32 is equal to or greater than the erasing limit times. The determination section 13 determines that the media cannot be reused any more.

Through the route of NO in ACT B4, the recording section 300 prints the linear ink mark line 33 (second mark) on the paper 30 in ACT B9.

FIG. 7 is a diagram illustrating a second example of the media attached with marks. In FIG. 7, the same reference numerals represent same components as shown in FIG. 6.

In this way, the paper discharge section 14 rejects the paper 30 printed with the ink mark line 33 to the paper discharge tray 112 in ACT B10.

The decoloring apparatus 12 terminates the processing in FIG. 5.

In this way, the decoloring apparatus 12 judges whether the media is usable for the first time after the paper is fed.

If it is detected that the reuse times reaches the erasing limit times through the judgment at the first time, the decoloring apparatus 12 prints the ink mark line 33 on the media, and then guides the media to the paper discharge tray 112. In this way, it is possible to shorten time and reduce the amount of power consumption. However, the decoloring apparatus 12 may record the ink mark line 33 based on the result of the determination at the second time after the erasing operations on the sheet are carried out.

The decoloring apparatus 12 prints the ink mark line 33 having a length from the printing start point on the paper 30 to the rear end of the paper.

The ink mark line 33 indicates that the paper cannot be reused any more.

Thus, the user can definitely identify that the paper is the one temporarily discharged to a reject tray (the paper discharge tray 112).

The decoloring apparatus 12 can determine that the paper on the paper discharge tray 112 is the rejected paper. The user will no longer use the paper of which the decoloring times is greater than a given times.

It is not required for the user to count all the marks stamped on the front and back sides of the paper, which improves the convenience for the user and the usability of the decoloring apparatus.

Further, for the media of which the use times do not reach the reuse times, since the reuse possibility can be determined through determination operation for two times, the determination precision can be reliable.

Further, it is assumed in the embodiment described above that the ink mark line 33 is recorded in a case in which the reuse times are equal to or greater than the erasing limit times. However, the present invention is not limited to the erasing times, and the ink mark line 33 may be recorded as a rejected mark when the paper is rejected.

At this time, the decoloring apparatus 12 may attach a mark different from that indicating the reuse times to the paper.

As the rejected reasons, the paper is bent or broken, a binding processing such as stapling is carried out on the paper, or the paper is not erased completely. The shape or color of the mark may vary with these different reasons.

In accordance with the marking apparatus and the decoloring apparatus according to the present embodiment, the inconvenience of a marking apparatus and a decoloring apparatus according to related technology can be eliminated. It is not required to determine whether or not the media is a media printed with decolorable toner.

Other Embodiment

The scanner 106 executes the determination on whether or not the media is printed with decolorable toner, and the determination on whether or not the media is reusable. The determination section 13 may carry out the above-mentioned determination.

The decolorable ink may be used as the decolorable color material.

The marks 32 and 34 may be printed on both sides (front side and back side) of the media.

In FIG. 3, the conveyance mechanism 214 and the paper discharge section 14 are independent from each other. The conveyance mechanism 214 may include the paper discharge section 14.

In the embodiment described above, the operation panel 135 and the controller 129 are exemplified. However, the marking apparatus 11 and the decoloring apparatus 12 can adopt a constitution different from the example described above.

The scan images may be stored in both the storage 210 and the storage 211.

The flowcharts are exemplified in the embodiment described above, but the present invention is not limited to these processing. Various modifications are possible for the method of the detection processing.

For the embodiments which are implemented with various modifications, there is no any damage to the superiorities of the apparatus and the method.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A marking apparatus which marks on reusable media on which recording with decolorable material is performed, and operative of erasing the material, the apparatus comprising:
a scanner configured to read the media to which a first mark representing reuse times of the media is attached;
a processor configured to determine whether or not the media is reusable according to a scanning result of the scanner, by judging the reuse times of the media based on the first mark and a physical state of the media that are detectable without using the first mark, the processor determining the media to be non-reusable when the detected physical state of the media falls under any of predetermined conditions; and
a printer configured to print a second mark different from the first mark representing that the media is non-reusable on the media according to a determination result of the processor, the printer printing the second mark in different forms on the media depending on the reuse times and the physical state judged by the processor.

2. The marking apparatus of claim 1, further comprising an decoloring device configured to erase an image recorded on the media, wherein
the processor determines a state of the media on which the image is erased by the decoloring device.

3. The marking apparatus of claim 1, wherein
the second mark printed by the printer is longer than the first mark.

4. The marking apparatus of claim 1, wherein
the printer records a continuous line from a marking start point on the media to a rear end in the conveyance direction of the media.

5. The marking apparatus of claim 1, wherein
the printer records information indicating that the media is non-reusable with any combination of each of the character, graph, sign and color or an equivalent mark to any one of the character, graph, sign and color.

6. A marking apparatus of claim 1, wherein
the printer varies a shape or color of the mark with different conditions.

7. A marking apparatus of claim 1, wherein
the conditions include cases that the media is bent, the media is broken, the media is not erased completely, a part on the media printed with non-decolorable toner remains not erased after the decoloring processing, or the media does not have usable thickness any longer, upon determination that the media is non-reusable.

8. A decoloring apparatus, comprising:
a scanner configured to be arranged on a first conveyance path to read media to which a first mark representing reuse times of the media is attached;
an decolorinq device configured to be arranged on a second conveyance path, which branches off from the first conveyance path at the downstream side of the scanner and merges with the first conveyance path at the upstream side of the scanner, the decoloring device erasing an image recorded on the media;
a processor configured to determine whether or not the media is reusable according to a scanning result of the scanner, by judging the reuse times of the media based on the first mark and a physical state of the media that are detectable without using the first mark, the processor determining the media to be non-reusable when the detected physical state of the media falls under any of predetermined conditions; and
a printer configured to print a second mark different from the first mark representing that the media is non-reusable on the media according to a determination result determined of the processor, the printer printing the second mark in different forms on the media depending on the reuse times and the physical state judged by the processor.

9. The decoloring apparatus of claim 8, wherein
the second mark printed by the printer is longer than the first mark in a media conveyance direction.

10. The decoloring apparatus of claim 8, wherein
the printer records a continuous line from a marking start point on the media to a rear end in the conveyance direction of the media.

11. The decoloring apparatus of claim 8, wherein
the printer records information indicating that the media cannot be reused with any combination of each of the character, graph, sign and color or an equivalent mark to any one of the character, graph, sign and color.

12. The decoloring apparatus of claim 8, wherein
the processor determines that the media is not reusable according to the scan image scanned by the scanner on the media that passes through the decolorinq device.

13. The decoloring apparatus of claim 8, wherein
the printer varies a shape or color of the mark depending on the reuse times and the detected physical state.

14. The decoloring apparatus of claim 8, wherein
the conditions include cases that the media is bent, the media is broken, the media is not erased completely, a part on the media printed with non-decolorable toner remains not erased after the decoloring processing, or the media does not have usable thickness any longer, upon determination that the media is non-reusable.

* * * * *